(12) United States Patent
Jiang et al.

(10) Patent No.: US 10,037,495 B2
(45) Date of Patent: Jul. 31, 2018

(54) CLUSTERING COEFFICIENT-BASED ADAPTIVE CLUSTERING METHOD AND SYSTEM

(71) Applicant: Tongji University, Shanghai (CN)

(72) Inventors: Changjun Jiang, Shanghai (CN); Hongzhong Chen, Shanghai (CN); Chungang Yan, Shanghai (CN); Zhijun Ding, Shanghai (CN); Mingjie Zhong, Shanghai (CN); Haichun Sun, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 15/504,093

(22) PCT Filed: Nov. 28, 2014

(86) PCT No.: PCT/CN2014/092450
§ 371 (c)(1),
(2) Date: Feb. 15, 2017

(87) PCT Pub. No.: WO2016/049975
PCT Pub. Date: Apr. 7, 2016

(65) Prior Publication Data
US 2017/0278016 A1    Sep. 28, 2017

(30) Foreign Application Priority Data
Sep. 29, 2014    (CN) .......................... 2014 1 0512802.0

(51) Int. Cl.
*G06F 17/30* (2006.01)
*G06N 99/00* (2010.01)

(52) U.S. Cl.
CPC ..... *G06N 99/005* (2013.01); *G06F 17/30536* (2013.01); *G06F 17/30867* (2013.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 5,136,687 A | * | 8/1992 | Edelman | G06K 9/6267 706/15 |
| 2016/0171494 A1 | * | 6/2016 | Jiang | G06Q 20/38 705/44 |
| 2017/0169350 A1 | * | 6/2017 | Jiang | G06F 17/16 |

FOREIGN PATENT DOCUMENTS

CN    103136337    6/2013

OTHER PUBLICATIONS

Gong, Maoguo et al.; "Two-Phase Clustering Algorithm for Complex Distributed Data", 1-10 Journal of Software, vol. 22, No. 11, Nov. 30, 2011 (Nov. 30, 2011), ISSN: 1000-9825, pp. 2760-2772.

(Continued)

*Primary Examiner* — Paulinho E Smith
(74) *Attorney, Agent, or Firm* — Global IP Services; Tianhua Gu (57) ABSTRACT

A clustering coefficient-based adaptive clustering method, according to the categories of extracted data point pairs and the magnitude of association relations between data points extracted each time, determining to which category the data points belong, and the number of the categories, and establishing association relations between the data points and association relations between the categories; pre-segmenting each category and calculating the intra-category similarities of two sub-categories and inter-category similarities of the two sub-categories, judging whether the two pre-segmented sub-categories satisfy a segmentation condition, if so, then (Continued)

accepting the pre-segmentation; if not, then canceling the pre-segmentation; calculating the intra-category similarities and inter-category similarities of two categories having an association relation, judging whether the two categories satisfy a merging condition, if so, then merging the two categories to generate a new category; if not, then abandoning the merging.

9 Claims, 5 Drawing Sheets

(56) References Cited

OTHER PUBLICATIONS

Cui, Xiaohui et al.; "Document Clustering Analysis Based on Hybrid PSO+K-means 1-10 Algorithm", Journal of Computer Science, special issue, Dec. 31, 2005 (Dec. 31, 2005), ISSN: 1549-3636, pp. 27-33.

* cited by examiner

FIG. 4

CLUSTERING COEFFICIENT-BASED ADAPTIVE CLUSTERING METHOD AND SYSTEM

CROSS REFERENCE TO RELATED PATENT APPLICATION

The present application is the US national stage of PCT/CN2014/092450 filed on Nov. 28, 2014, which claims the priority of the Chinese patent application No. 2014105128020 filed on Sep. 29, 2014, which applications are incorporated herein by reference.

BACKGROUND OF THE PRESENT INVENTION

Field of Invention

The present invention belongs to the technical field of a network technology-based text analysis and relates to a network technology-based adaptive clustering method, in particular to a clustering coefficient-based adaptive clustering method and system.

Description of Related Arts

Gradual networking and virtualization of data of the real world enable the number of data on networks to be sharply increased. With the continuous accumulation of the data, the data on the networks imply a great amount of intrinsic knowledge, which can help people to complete a series of smart applications such as data analysis and decision-making support. People increasingly desire to acquire information and knowledge from these numerous data to reveal information which is implied, has not been known ever before and has a potential value. The field related to data mining again becomes one of research directions which are hot at present. Clustering analysis is a very active research field of data mining. In brief, it is a process of performing analysis to physical or abstract object sets so as to divide objects with similar features in a same category and divide objects with dissimilar features in different categories. Clustering algorithms play a very great role in fields such as mode recognition, smart search, biological information and semantic disambiguation.

At present, a lot of clustering algorithms have been put forward. Generally, the existing clustering algorithms can be divided into five categories, i.e., segmentation methods, hierarchical methods, density-based methods, grid-based methods and model-based methods. When intra-category similarities are considered, most clustering algorithms only consider similarities between other elements and core element in a category or consider similarities between adjacent elements, and do not consider pairwise similarities between elements in the category. Therefore, the existing clustering algorithms cannot more accurately cluster network data.

Thus, it has actually been a technical problem to be urgently solved by one skilled in the art on how to provide a clustering coefficient-based adaptive clustering method and system applied to computer networks, so as to overcome various defects that there are clustering methods which only take similarities between other elements and a core element in a category or similarities between adjacent elements in data clustering processes into consideration in the prior art, there are no clustering methods which takes similarities between elements in the category into consideration and data cannot be more accurately clustered.

SUMMARY OF THE PRESENT INVENTION

In view of the disadvantages of the prior art, the purpose of the present invention is to provide a clustering coefficient-based adaptive clustering method and system, so as to solve the problems that there are clustering methods which only takes similarities between other elements and a core element in a category or consider similarities between adjacent elements in data clustering processes into consideration in the prior art, there are no clustering methods which takes similarities between elements in the category into consideration and data cannot be clustered more accurately.

In order to realize the above-mentioned purpose and other related purposes, in one aspect, the present invention provides a clustering coefficient-based adaptive clustering method, used for a set of elements to be clustered in a computer network system constructed by a plurality of servers and clients, the set comprises data points in a plurality of clustering object sets, the clustering coefficient-based adaptive clustering method comprises: a preliminary clustering step, i.e., acquiring association relations between the data points in the plurality of clustering object sets, acquiring the number of neighbor points in a nearest-neighbor algorithm applicable for searching of the number of the neighbor points, and acquiring a distribution curve convergence rate of the data points through a curve fitting technique; sequentially extracting data point pairs according to a magnitude of the association relations between the data points, determining to which category the data points belongs and the number of the categories according to the category of the extracted data point pairs and the magnitude of the association relation between the data points extracted each time, and establishing a association relation between the data points and a association relation between the categories till all data points are processed to acquire preliminary clustering results; and a self-learning clustering step, comprising: a segmentation step, i.e., calculating an intra-category similarity of each category, calculating a local clustering coefficient of data points in each category, comparing the intra-category similarity of each category with the local clustering coefficient of the data points in each category, performing pre-segmentation according to a segmentation mode of segmenting each category into two sub-categories which respectively have a local clustering coefficient of data points greater than or equal to the intra-category similarity and a local clustering coefficient of data points smaller than the intra-category similarity, calculating the intra-category similarities of the two sub-categories and the inter-category similarities of the two sub-categories, judging whether the two pre-segmented sub-categories satisfy a segmentation condition, if so, then accepting the pre-segmentation, generating a category set consisting of a plurality of categories and continuously performing a next step; if not, then canceling the pre-segmentation; a searching step, i.e., searching for two categories having a association relation in the category set; and a merging step, i.e., calculating the intra-category similarities of the two categories having the association relation and the inter-category similarities of the two categories, judging whether the two categories having the association relation satisfy a merging condition, if so, indicating the relation between the two categories is close, and then merging the two categories to generate a new category; if not, indicating the relation between the two categories is distant, and then abandoning the merging.

Preferably, the preliminary clustering step in the clustering coefficient-based adaptive clustering method further comprises the steps of: performing statistics to distribution information of the association relations between the data points in the plurality of clustering object sets, and acquiring a curve convergence rate of the association relations between the data points in the plurality of clustering object sets by adopting the curve fitting technique according to the statistical distribution information; and performing statistics to the distribution information of the number of neighbor points between the data points according to the nearest-neighbor algorithm for searching the number of the neighbor points, acquiring a determined value of the number of the neighbor points, judging whether the number of the data points having the number of neighbor points greater than the determined value of the number of the neighbor points is greater than a predetermined number, if so, then continuously executing the step of sequentially extracting the data point pairs according to the magnitude of the association relation between the data points; if not, terminating the process.

Optionally, the segmentation step further comprises steps of updating the inter-category association relations between the two sub-categories and other categories, and deleting the inter-category association relations between the category to which the two sub-categories originally belongs and other categories; the merging step further comprises steps of updating the inter-category association relations between a new generated category and other categories, and deleting the inter-category association relations between the two categories and other categories.

Optionally, the two sub-categories in the segmentation step comprise a sub-category A and a sub-category B, formulas for calculating the intra-category similarities of the two sub-categories A and B are respectively as follows:

$$clu(A) = \frac{\sum_{v_i \in V_A, e_{ij} \in E_A} C(i)}{|V_A|};$$

$$clu(B) = \frac{\sum_{v_i \in V_B, e_{ij} \in E_B} C(i)}{|V_B|};$$

wherein $V_i$ denotes data point i, $V_A$ denotes a set of data points in the sub-category A, $V_B$ denotes a set of data points in the sub-category B, $|V_A|$ denotes the number of data points in the sub-category A, $|V_B|$ denotes the number of data points in the sub-category B, $e_{ij}$ denotes the edge connecting the data point i and the data point j, $E_A$ denotes a set of edges in the sub-category A, $E_B$ denotes a set of edges in the sub-category B, and C(i) is a local clustering coefficient of the data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}},$$

wherein $V_j$, $V_k$ denote data points j, k, N(i) denotes a neighbor point set of the data point $V_i$, E is a set of edges, $k_i$ denotes the number of N(i), and $e_{jk}$ denotes the edge connecting data point j and data point k; and formulas for calculating the inter-category similarities of the two sub-categories A and B are respectively as follows:

$$assoc(A') = \frac{\sum_{v_i \in V_{A'}, e_{ij} \in U} C(i)}{|V_{A'}|};$$

$$assoc(B') = \frac{\sum_{v_i \in V_{B'}, e_{ij} \in U} C(i)}{|V_{B'}|};$$

wherein $V_i$ denotes the data point i, A' denotes the sub-category A and the category of data points which belongs to the category B and has association relations with the sub-category A, B' denotes the sub-category B and the category of data points which belongs to the sub-category A and has association relations with the sub-category B, $|V_{A'}|$ denotes the number of data points in category A', $|V_{B'}|$ denotes the number of data points in category B', $V_A$ denotes a set of data points in the sub-category A, $V_B$ denotes a set of data points in the sub-category B, $e_{ij}$ denotes the edge connecting the data point i and the data point j, and C(i) is a local clustering coefficient of the data point Vi, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}}.$$

Optionally, the segmentation condition is that the intra-category similarities of the two sub-categories are respectively greater than the inter-category similarities of the two sub-categories, i.e., clu(A)>assoc(A') and clu(B)>assoc(B').

Optionally, in the merging step, the two categories comprise a category A1 and a category A2, formulas for calculating the intra-category similarities of the two categories A1 and A2 are respectively as follows:

$$clu(A1) = \frac{\sum_{v_i \in V_{A1}, e_{ij} \in E_{A1}} C(i)}{|V_{A1}|}; clu(A2) = \frac{\sum_{v_i \in V_{A2}, e_{ij} \in E_{A1}} C(i)}{|V_{A2}|};$$

wherein $V_i$ denotes a data point i, $V_{A1}$ denotes a set of data points in the category A1, $V_{A2}$ denotes a set of data points in the category A2, $|V_{A1}|$ denotes the number of the data points in the category A1, $|V_{A2}|$ denotes the number of the data points in the category A2, $e_{ij}$ denotes the edge connecting the data point i and the data point j, $E_{A1}$ denotes a set of edges in the category A1, $E_{A2}$ denotes a set of edges in the category A2, and C(i) is a local clustering coefficient of the data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}},$$

wherein $V_j, V_k$ denote the data points j, k, N(i) denotes a set of neighbor points of the data point $V_i$, E is a set of edges, $k_i$ denotes the number of N(i), and $e_{jk}$ denotes the edge connecting the data point j and the data point k; and formulas for calculating the inter-category similarities of the two categories A1 and A2 are respectively as follows:

$$assoc(A1') = \frac{\sum_{v_i \in V_{A1}, e_{ij} \in U} C(i)}{|V_{A1'}|}; assoc(A2') = \frac{\sum_{v_i \in V_{A2'}, e_{ij} \in U} C(i)}{|V_{A2'}|};$$

wherein Vi denotes the data point i, A1' denotes the category A1 and the category of data points which belong to category A2 and have association relations with the category A1, A2' denotes the category A2 and the category of data points which belong to category A1 and have association relations with category A2, $|V_{A1'}|$ denotes the number of data points in the category A1', $|V_{A2'}|$ denotes the number of data points in the category A2', $V_{A1}$ denotes a set of data points in the category A1, $V_{A2}$ denotes a set of data points in the category A2, $e_{ij}$ denotes the edge connecting the data point i and the data point j, and C(i) is a local clustering coefficient of the data point Vi, $$C(i) = \frac{[\{e_{jk}: V_j, V_k \in N(i), e_{jk} \in E\}]}{\frac{k_i(k_i-1)}{2} \frac{\sum_{e_{jk} \in N(i)} e_{jk}}{k_i}}.$$

Optionally, the merging conditions are that the inter-category similarities of the two categories are respectively greater than the intra-category similarities of the two categories, i.e., clu(A1)≤assoc(A1') and clu(A2)≤assoc(A2').

Optionally, the step of sequentially extracting the data point pairs according to the magnitude of the association relations between the data points further comprises the step of detecting whether the extracted data point pairs satisfy features of one category according to a detection principle.

Optionally, the detection principle is as follows: supposing that the number of data points in the one category is $n_1$, an intra-category average relation weight is $avg(n_1)$, a relation weight between the extracted data points and intra-category data points in the one category is $w_1$ and an average relation weight convergence rate of the one category is $y'_{n_1}$, if a formula $(1+y_{n_1}')*avg(n_1) > w_1$ is satisfied, the extracted data points can be added into the one category; or else, the extracted data points cannot be added into the one category.

In another aspect, the present invention provides a clustering coefficient-based adaptive clustering system, used for a set of elements to be clustered in a computer network system constructed by a plurality of servers and clients, the set comprises data points in a plurality of clustering object sets, the clustering coefficient-based adaptive clustering system comprises: a preliminary clustering module used for completing preliminary clustering, the preliminary clustering module comprising a preprocessing unit and a preliminary clustering unit, wherein the preprocessing unit is used for acquiring association relations between the data points in the plurality of clustering object sets, acquiring the number of neighbor points in a nearest-neighbor algorithm applicable for searching of the number of the neighbor points, and acquiring a distribution curve convergence rate of the data points through a curve fitting technique; the preliminary clustering unit is used for sequentially extracting data point pairs according to magnitude of association relations between the data points, determining to which category the data points belongs and the number of the categories according to the categories of the extracted data point pairs and the magnitude of association relations between the extracted data points, and establishing association relations between the data points and association relations between the categories till all data points are processed to acquire preliminary clustering results; and a self-learning clustering module used for completing self-learning clustering, the self-learning clustering module comprising a first calculation unit, a pre-segmentation unit, a first judgment unit, a searching unit, a second calculation unit, a second judgment unit and a merging unit, wherein the first calculation unit is used for calculating an intra-category similarity of each category, calculating a local clustering coefficient of data points in each category, comparing the intra-category similarity of each category with the local clustering coefficient of the data points in each category, and calling the pre-segmentation unit; the pre-segmentation unit is used for performing pre-segmentation according to a segmentation mode of segmenting each category into two sub-categories which respectively have a local clustering coefficient of data points greater than or equal to the intra-category similarity and a local clustering coefficient of data points smaller than the intra-category similarity, and calculating intra-category similarities of the two sub-categories and inter-category similarities of the two sub-categories; the first judgment unit is used for judging whether the two pre-segmented sub-categories satisfy the segmentation condition, if so, then accepting the pre-segmentation and generating a category set consisting of a plurality of categories; if not, then canceling the pre-segmentation; the searching unit is used for searching two categories having a association relation in the category set; the second calculation unit is used for calculating intra-category similarities of the two categories having the association relation and inter-category similarities of the two categories; and the second judgment unit is used for judging whether the two categories having the association relation satisfy a merging condition, if so, indicating the relation between the two categories is close, and then calling the merge unit to merge the two categories to generate a new category; if not, indicating the relation between the two categories is distant, and then abandoning the merging.

As described above, the clustering coefficient-based adaptive clustering method and system provided by the present invention have the following beneficial effects:

the clustering coefficient-based adaptive clustering method and system provided by the present invention introduces the relations between the data points into the clustering algorithm for the first time, and thus enables data to be clustered more accurately.

DESCRIPTION OF COMPONENT REFERENCE SIGNS 1 clustering coefficient-based adaptive clustering system
11 preliminary clustering module 12 self-learning clustering module
111 preprocessing unit
112 preliminary clustering unit
121 first calculation unit
122 pre-segmentation unit
123 first judgment unit
124 searching unit
124 second calculation unit
125 second judgment unit
126 merging unit
S1-S2 steps
S151-S170 steps

DETAILED DESCRIPTION OF THE PREFERRED EMBODIMENTS

The embodiments of the present invention will be described below through specific examples. One skilled in the art can easily understand other advantages and effects of the present invention according to contents disclosed in the description. The present invention can also be implemented or applied through other different specific embodiments. Various modifications or variations can be made to all details in the description based on different points of view and applications without departing from the spirit of the present invention. It needs to be stated that the embodiments of the present invention and the features in the embodiments can be combined with one another under the situation of no conflict.

It needs to be stated that the drawings provided in the following embodiments are just used for schematically describing the basic concept of the present invention, thus only illustrate components only related to the present invention and are not drawn according to the numbers, shapes and magnitudes of components during actual implementation, the configuration, number and scale of each component during actual implementation thereof may be freely changed, and the component layout configuration thereof may be more complex.

The present invention provides a new clustering algorithm aiming at solving the problem that the existing clustering methods only take relations between data points and a core data point or relations between a data point and adjacent data points into consideration in clustering processes and ignores relations between data points. In the clustering process, the clustering algorithm introduces clustering coefficients in the graph theory, calculates relations between data points based on the clustering coefficients and thus calculates intra-category and inter-category similarities.

Embodiment 1

This embodiment provides a clustering coefficient-based adaptive clustering method, applied to a set of elements to be clustered, the set therein comprises data points in a plurality of clustering object sets. In this embodiment, the clustering coefficient-based adaptive clustering method is applied to a computer network system constructed by a plurality of servers and clients, and mines network data information through a network communication technology to more accurately cluster network data.

Figure 1:
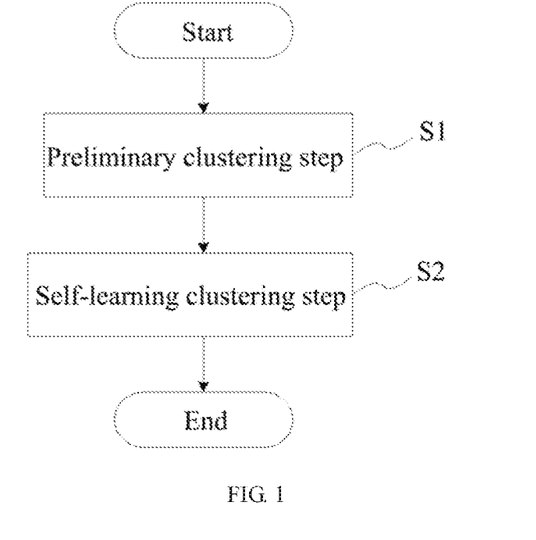
FIG. 1 illustrates a flowchart of a clustering coefficient-based adaptive clustering method provided by the present invention.
Figure 2:
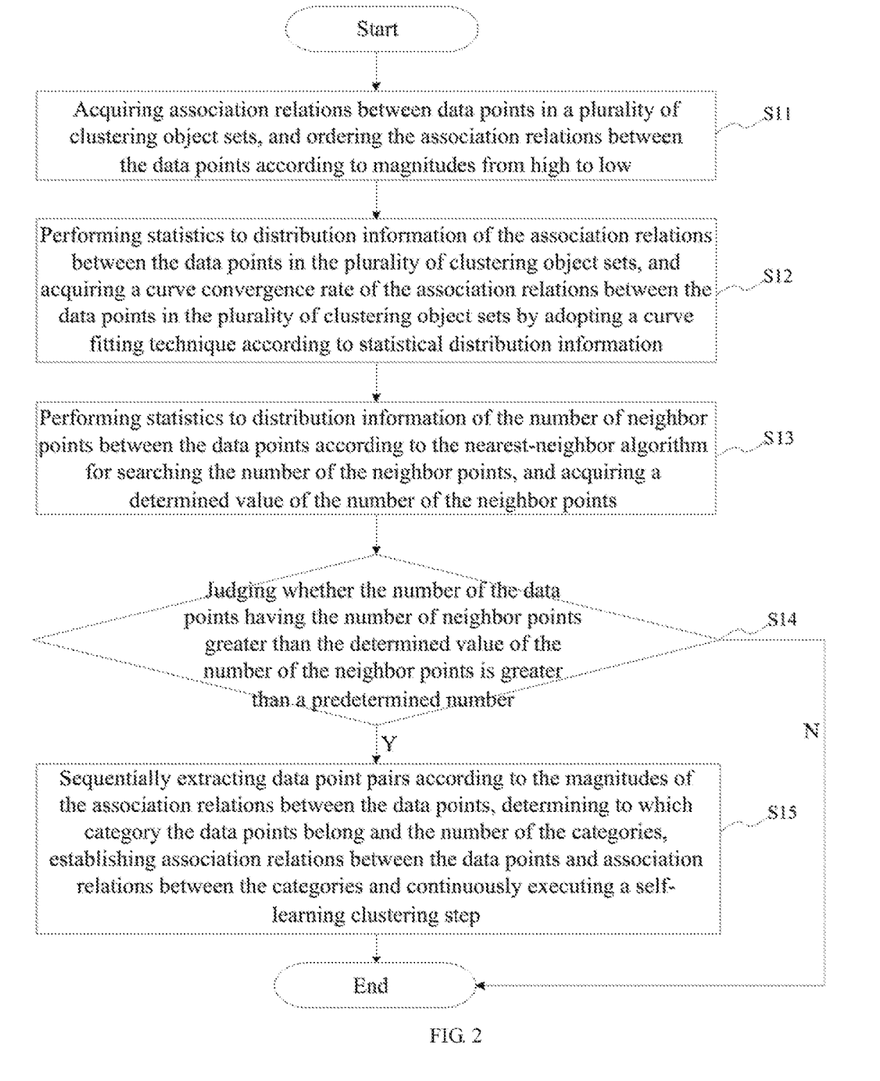
FIG. 2 illustrates a specific flowchart of a preliminary clustering step provided by the present invention.

Please refer to FIG. 1, it is illustrated a flowchart of a clustering coefficient-based adaptive clustering method, which comprises:

S1: a preliminary clustering step. Please refer to FIG. 2, which illustrates a specific flowchart of the preliminary clustering step. As shown in FIG. 2, the preliminary clustering step comprises the following steps:

S11: acquiring association relations between data points in a plurality of clustering object sets, and ordering the association relations between the data points according to magnitude from high to low. For example, the association relations can be expressed by using association degree values, and from the angle of a graph, the association degree values are magnitude of weights of edges. At this point, the data points are vertexes in the graph, and the association relations between the data points are edges between the vertexes. The existence of an association relation indicates the existence of an edge, and the magnitude of the association relation is the magnitude of the weight of the edge (the greater the association value is, the shorter the length of the edge is, and intuitively the greater the association relation is, the shorter the distance between the vertexes is and the closer the vertexes are). Reciprocals of original association values can be expressed as side length between vertexes, i.e., the association degree values called in an algorithm.

S12: performing statistics to distribution information of the association relations between the data points in the plurality of clustering object sets, and acquiring a curve convergence rate of the association relations between the data points in the plurality of clustering object sets by adopting a curve fitting technique according to statistical distribution information.

S13: performing statistics to distribution information of the number of neighbor points between the data points according to the nearest-neighbor algorithm for searching the number of the neighbor points, i.e., the k-nearest neighbor algorithm, k denoting the number of neighbor points, and acquiring a determined value of the number of the neighbor points.

S14: judging whether the number of the data points having the number of neighbor points greater than the determined value of the number of the neighbor points is greater than a predetermined number, if so, then continuously executing step S15; if not, then terminating the process. In step S14, the predetermined number is 90% of the data points in the clustering object sets.

Figure 3A:
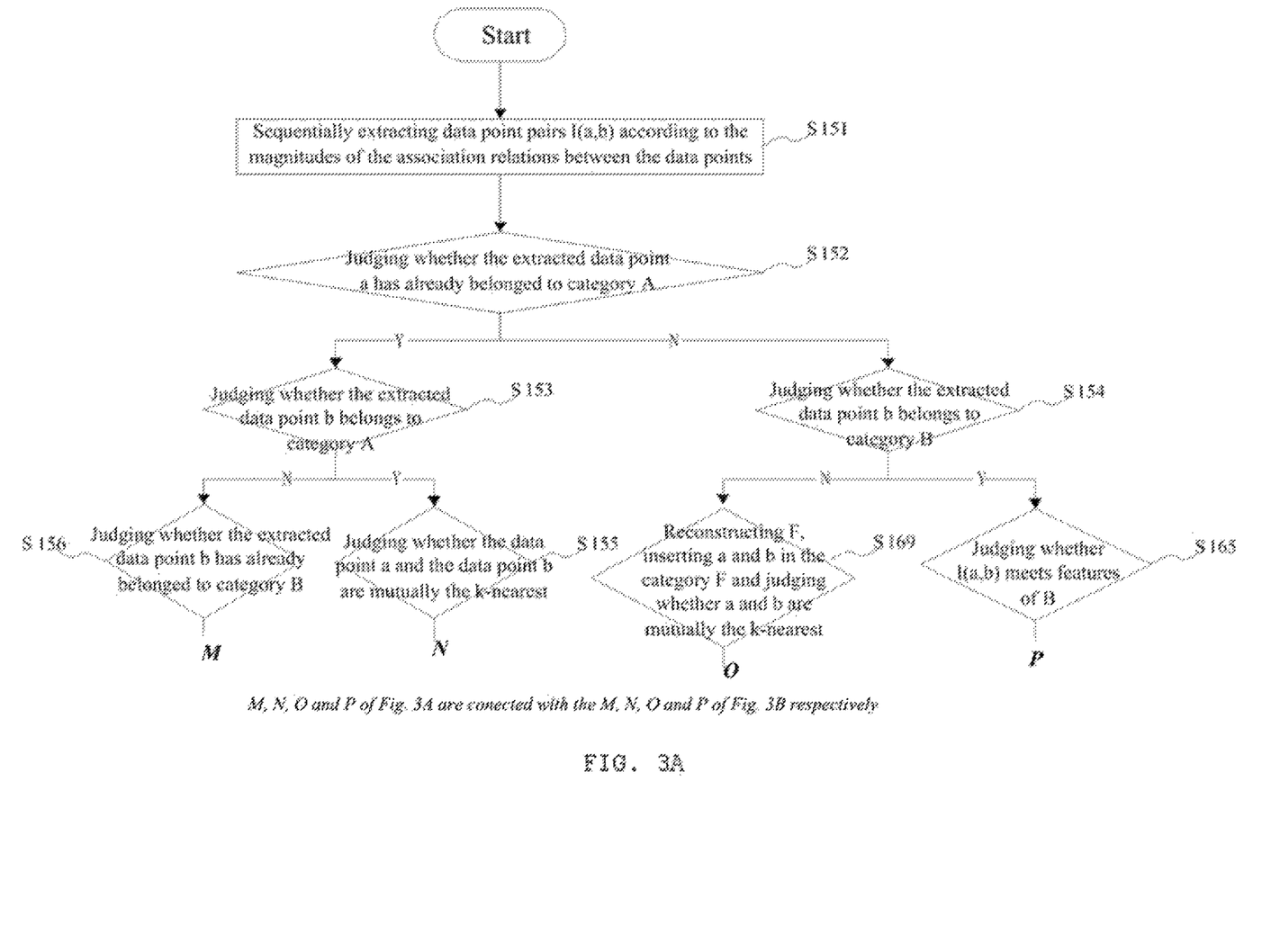
FIGS. 3A and 3B illustrates a specific flowchart of step S15 provided by the present invention.
Figure 3B:
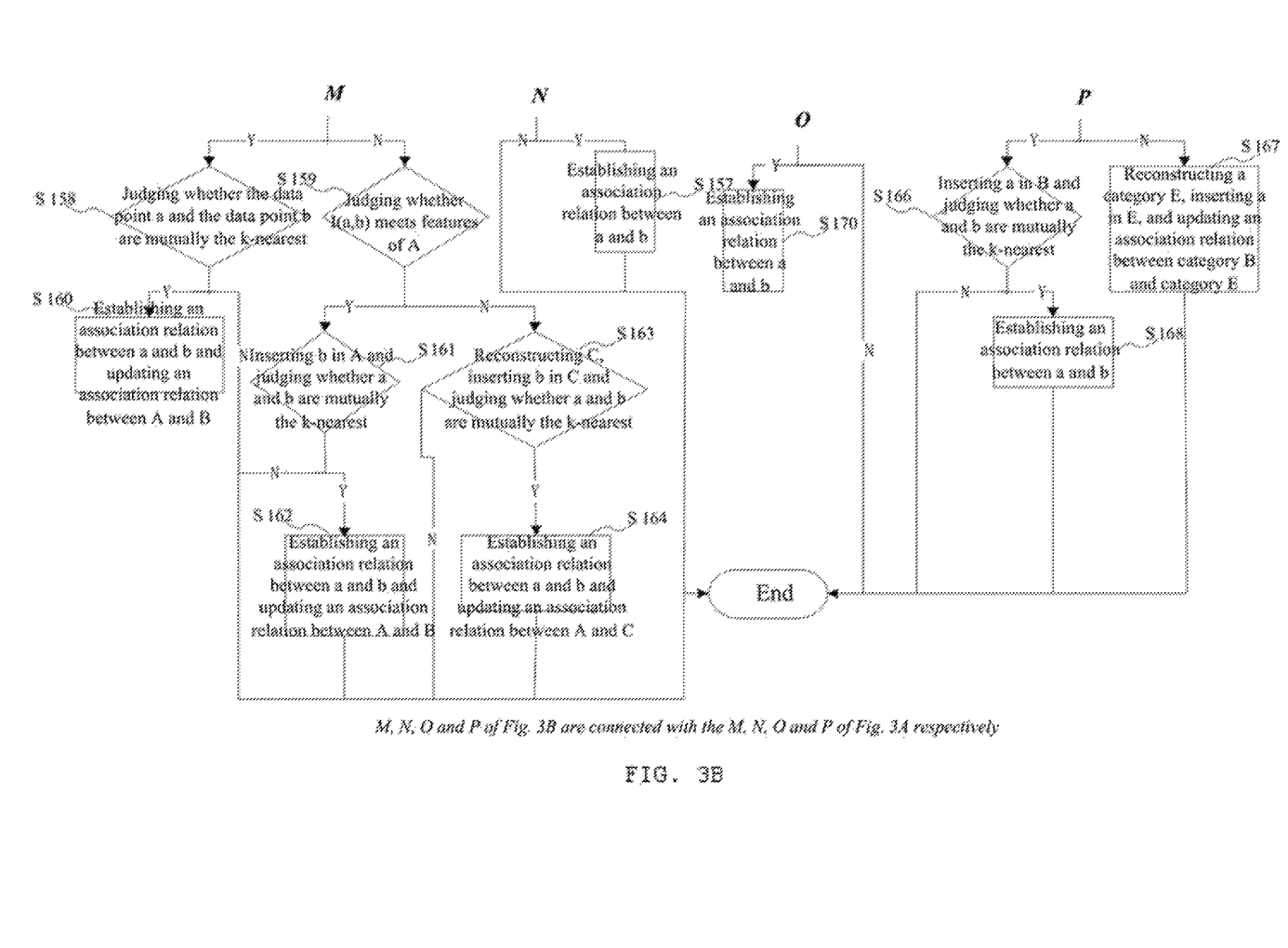

S15: sequentially extracting data point pairs according to the magnitude of the association relations between the data points, determining which category of the data points belongs to and the number of the categories according to categories of the extracted data point pairs and magnitude of association relations between the extracted data points, establishing association relations between the data points and association relations between the categories till all data points are processed to acquire preliminary clustering results and continuous executing a self-learning clustering step. Please refer to FIG. 3, which illustrates a specific flowchart of step S15. Step S15 comprises the following steps:

S151: sequentially extracting data point pairs according to the magnitude of the association relations between the data points. For example, in step S151, the extracted data point pair is I(a,b), wherein a and b respectively denote data points.

S152: detecting whether the extracted data point a has already belonged to one category A, if so, then continuously executing step S153; if not, then executing step S154 if the extracted data point a has not already belonged to one category A.

S153: similarly detecting whether the extracted data point b belongs to one category A, if so, then executing step S155, if not, then executing step S156.

S155: judging whether the data point a and the data point b are mutually the k-nearest or not, if so, then executing step S157, i.e., establishing an association relation between the data point a and the data point b; if not, indicating that no association relation is established between the data point a and the data point b and then terminating the process.

S156: judging whether the data point b has already belonged to another category B, if so, then executing step S158; if not, then executing step S159.

S158: judging whether the data point a and the data point b are mutually the k-nearest, if so, then executing step S160, i.e., establishing an association relation between the data point a and the data point b and updating an association relation between the category A and the category B; if not, indicating that no association relation is established between the data point a and the data point b and then terminating the process.

S159: judging whether a magnitude of the association relation between the extracted data point a and data point b satisfies structural features of the category A according to a detection principle as follows: supposing that the number of data points in the one category A is $n_1$, an intra-category average relation weight is $avg(n_1)$, a relation weight between the extracted data points and intra-category data points in the one category is $w_1$ and an average relation weight convergence rate of the one category is $y_{n_1}'$, if a formula $(1+y_{n_1}')* avg(n_1) > w_1$ is satisfied, step S161 is executed; or else, the extracted data point b is not added into the one category A and step S163 is executed.

S161: adding the extracted data point b into the category A, judging whether the data point a and the data point b are mutually the k-nearest, if so, then executing step S162, i.e., establishing an association relation between the data point a and the data point b and updating an association relation between the category A and the category B; if not, indicating that no association relation is established between the data point a and the data point b and then terminating the process.

S163: reconstructing another category C, inserting the data point b in the category C, judging whether the data point a and the data point b are mutually the k-nearest, if so, then executing step S164, i.e., establishing an association relation between the data point a and the data point b and updating an association relation between the category A and the category B; if not, indicating that no association relation is established between the data point a and the data point b and then terminating the process.

then executing step S152 of detecting whether the extracted data point a has already belonged to one category A, if not, then executing step S154 of judging whether the data point b belongs to the category B, if so, then executing step S165, if not, then executing step S169.

S165: judging whether the magnitude of the association relation between the extracted data point a and data point b satisfies structural features of the category B according to the detection principle as follows: supposing that the number of data points in the one category B is $n_1$, an intra-category average relation weight is $avg(n_1)$, a relation weight between the extracted data points and intra-category data points in the one category is $w_1$ and an average relation weight convergence rate of the one category is $y_{n_1}'$, if a formula $(1+y_{n_1}')* avg(n_1) > w_1$ is satisfied, step S166 is executed; or else, the extracted data point a is not added into the one category A and step S167 is executed.

S166: adding the data point a into the category B, judging whether the data point a and the data point b are mutually the k-nearest, if so, then executing step S168, i.e., establishing an association relation between the data point a and the data point; if not, indicating that no association relation is established between the data point a and the data point b and then terminating the process.

S167: reconstructing another category E, inserting the data point a in the category E and updating an association relation between the category B and the category E.

S169: reconstructing another category F, inserting the data point pair consisting of the data point a and the data point b in the category F, judging whether the data point a and the data point b are mutually the k-nearest, if so, then executing step S170, i.e., establishing an association relation between the data point a and the data point b; if not, indicating that no association relation is established between the data point a and the data point b and then terminating the process.

In this embodiment, completion of extraction of all data points in the plurality of clustering object sets is a sign of completion of the preliminary clustering step.

S2: a self-learning clustering step, wherein the self-learning clustering step comprises the following steps:

A first step: calculating an intra-category similarity of each category, calculating a local clustering coefficient of data points in each category, comparing the intra-category similarity of each category with the local clustering coefficient of the data points in each category, and performing pre-segmentation according to a segmentation mode of segmentation each category into two sub-categories which respectively have a local clustering coefficient of data points greater than or equal to the intra-category similarity and a local clustering coefficient of data points smaller than the intra-category similarity;

A second step: calculating intra-category similarities of the two sub-categories and inter-category similarities of the two sub-categories, wherein in this embodiment, the two sub-categories comprise a sub-category A and a sub-category B, formulas for calculating intra-category similarities of the two sub-categories A and B are respectively as follows:

$$clu(A) = \frac{\sum_{v_i \in V_A, e_{ij} \in E_A} C(i)}{|V_A|} \quad (1)$$

$$clu(B) = \frac{\sum_{v_i \in V_B, e_{ij} \in E_B} C(i)}{|V_B|} \quad (2)$$

wherein $V_i$ denotes data point i, $V_A$ denotes a set of data points in sub-category A, $V_B$ denotes a set of data points in sub-category B, $|V_A|$ denotes the number of data points in the sub-category A, $|V_B|$ denotes the number of data points in the sub-category B, $e_{ij}$ denotes the edge connecting data point i and data point j, $E_A$ denotes a set of edges in the sub-category A, $E_B$ denotes a set of edges in the sub-category B, and C(i) is a local clustering coefficient of data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}} \quad (3)$$

wherein $V_j$, $V_k$ denote data points j, k, N(i) denotes a neighbor point set of data point $V_i$, E is a set of edges, $k_i$ denotes the number of N(i), and $e_{jk}$ denotes the edge connecting data point j and data point k; and formulas for calculating inter-category similarities of the two sub-categories A and B are respectively as follows:

$$assoc(A') = \frac{\sum_{v_i \in V_{A'}, e_{ij} \in U} C(i)}{|V_{A'}|} \quad (4)$$

$$assoc(B') = \frac{\sum_{v_i \in V_{B'}, e_{ij} \in U} C(i)}{|V_{B'}|} \quad (5)$$

wherein $V_i$ denotes the data point i, A' denotes sub-category A and category of data points which belong to category B and have association relations with sub-category A, B' denotes sub-category B and category of data points which belong to sub-category A and have association relations with sub-category B, $|V_{A'}|$, denotes the number of data points in category A', $|V_{B'}|$ denotes the number of data points in category B', $V_A$ denotes a set of data points in the sub-category A, $V_B$ denotes a set of data points in the sub-category B, $e_{ij}$ denotes the edge connecting data point i and data point j, and C(i) is a local clustering coefficient of data point Vi, $$C(i) = \frac{|\{e_{jk}: V_j, V_k \in N(i), e_{jk} \in E\}|}{\frac{k_i(k_i-1)}{2}} \frac{\sum_{e_{jk} \in N(i)} e_{jk}}{k_i}.$$

A third step: judging whether the two pre-segmented sub-categories satisfy a segmentation conditions, wherein the segmentation condition is that the intra-category similarities of the two sub-categories are respectively greater than the inter-category similarities of the two sub-categories, i.e., clu(A)>assoc(A') and clu(B)>assoc(B'); if so, then accepting the pre-segmentation, and generating a category set consisting of a plurality of categories, wherein, the two pre-segmented sub-category A and sub-category B, i.e., new generated categories also belong to the category set; if not, then canceling the pre-segmentation and terminating the process. Wherein, the step of accepting the pre-segmentation further comprises the steps of updating inter-category association relations between the two new generated categories and other categories, and deleting inter-category association relations between an original category of the two sub-categories and other categories. When the segmentation step is executed in this embodiment, all categories need to be traversed.

A fourth step: searching two categories having an association relation in the category set, wherein since each category therein comprises data points, the two categories having the association relation refer to that the two categories have an intersection therebetween;

A fifth step: calculating intra-category similarities of the two categories having the association relation and inter-category similarities of the two categories, wherein in this embodiment, the two categories having an association relation comprise a category A1 and a category A2, and specific calculation processes are as follows:

formulas for calculating intra-category similarities of the two categories A1 and A2 are respectively as follows:

$$clu(A1) = \frac{\sum_{v_i \in V_{A1}, e_{ij} \in E_{A1}} C(i)}{|V_{A1}|} \quad (6)$$

$$clu(A2) = \frac{\sum_{v_i \in V_{A2}, e_{ij} \in E_{A2}} C(i)}{|V_{A2}|} \quad (7)$$

wherein $V_i$ denotes data point i, $V_{A1}$ denotes a set of data points in category A1, $V_{A2}$ denotes a set of data points in category A2, $|V_{A1}|$ denotes the number of data points in category A1, $|V_{A2}|$ denotes the number of data points in category A2, $e_{ij}$ denotes the edge connecting data point i and data point j, $E_{A1}$ denotes a set of edges in category A1, $E_{A2}$ denotes a set of edges in category A2, and C(i) is a local clustering coefficient of data point Vi, $$CC(i) = \frac{|\{e_{jk}: V_j, V_k \in N(i), e_{jk} \in E\}|}{\frac{k_i(k_i-1)}{2}} \frac{\sum_{e_{jk} \in N(i)} e_{jk}}{k_i},$$

wherein $V_j$, $V_k$ denote data points j, k, N(i) denotes a neighbor point set of data point $V_i$, E is a set of edges, $k_i$ denotes the number of N(i), and $e_{jk}$ denotes the edge connecting data point j and data point k; and formulas for calculating inter-category similarities of the two categories A1 and A2 are respectively as follows:

$$assoc(A1') = \frac{\sum_{v_i \in V_{A1'}, e_{ij} \in U} C(i)}{|V_{A1'}|} \quad (8)$$

$$assoc(A2') = \frac{\sum_{v_i \in V_{A2'}, e_{ij} \in U} C(i)}{|V_{A2'}|} \quad (9)$$

wherein $V_i$ denotes data point i, A1' denotes category A1 and category of data points which belong to category A2 and have association relations with category A1, A2' denotes category A2 and category of data points which belong to category A1 and have association relations with category A2, $|V_{A1'}|$ denotes the number of data points in category A1', $|V_{A2'}|$ denotes the number of data points in category A2', $V_{A1}$ denotes a set of data points in category A1, $V_{A2}$ denotes a set of data points in category A2, $e_{ij}$ denotes the edge connecting data point i and data point j, and C(i) is a local clustering coefficient of data point $V_i$, $$C(i) = \frac{|\{e_{jk}: V_j, V_k \in N(i), e_{jk} \in E\}|}{\frac{k_i(k_i-1)}{2}} \frac{\sum_{e_{jk} \in N(i)} e_{jk}}{k_i}.$$

A sixth step: judging whether the two categories A1 and A2 satisfy a merging condition, wherein the merging condition is that the inter-category similarities of the two categories are respectively greater than the intra-category similarities of the two categories, i.e., clu(A1)≤assoc(A1') and clu(A2)≤assoc(A2'); if so, indicating the relation between the two categories is close and then executing a seventh step, i.e., merging the two categories to generate a new category; if not, indicating the relation between the two categories is distant and then abandoning the merging. The step of performing the merging to the two category to generate the new category further comprises the steps of updating inter-category association relations between the new generated category and other categories, and deleting inter-category association relations between the two categories and other categories; and when the merging step is executed in this embodiment, all categories need to be traversed;

An eighth step: performing pre-segmentation again to all categories generated after the segmentation and the merging, judging whether the pre-segmented categories satisfy the segmentation condition, if so, accepting the pre-segmentation, judging whether every two categories in the new category set after segmentation satisfy the merging condition, if so, then merging the two categories which satisfy the merging condition, if not, then abandoning the merging; Abandoning the pre-segmentation if the pre-segmented categories do not satisfy the segmentation condition. wherein in this step, the eighth step is cyclically executed, and the segmentation and merging performed at each time aim at the categories generated after the segmentation and merging at the previous time; and A ninth step: judging whether the number of times of executing the segmentation and merging steps has already reached an iteration threshold or not or judging whether categories which further need to be segmented and combined exist or not, if so, terminating the process, and if not, returning to the eighth step.

One skilled in the art can understand that all or partial steps in the method in the above-mentioned embodiment can be completed by relevant hardware instructed by a program, and the program can be stored in a computer readable storage medium such as a read only memory, a magnetic disk or a compact disk. In this embodiment, various processing of the clustering coefficient-based adaptive clustering method can be executed through a central processing unit on a server according to the program stored in the read only memory or a program loaded to a random access memory.

When the clustering coefficient-based adaptive clustering method in this embodiment is compared with the prior art, since the clustering coefficient-based adaptive clustering method introduces relations between data points, i.e., similarities between categories into a clustering algorithm for the first time, data can be more accurately clustered.

Embodiment 2

This embodiment provides a clustering coefficient-based adaptive clustering system, applied to a set of elements to be clustered, and the set therein comprises data points in a plurality of clustering object sets. In this embodiment, the clustering coefficient-based adaptive clustering system is applied to a computer network system constructed by a plurality of servers and clients and mines network data information through a network communication technology to more accurately cluster network data.

Figure 4:
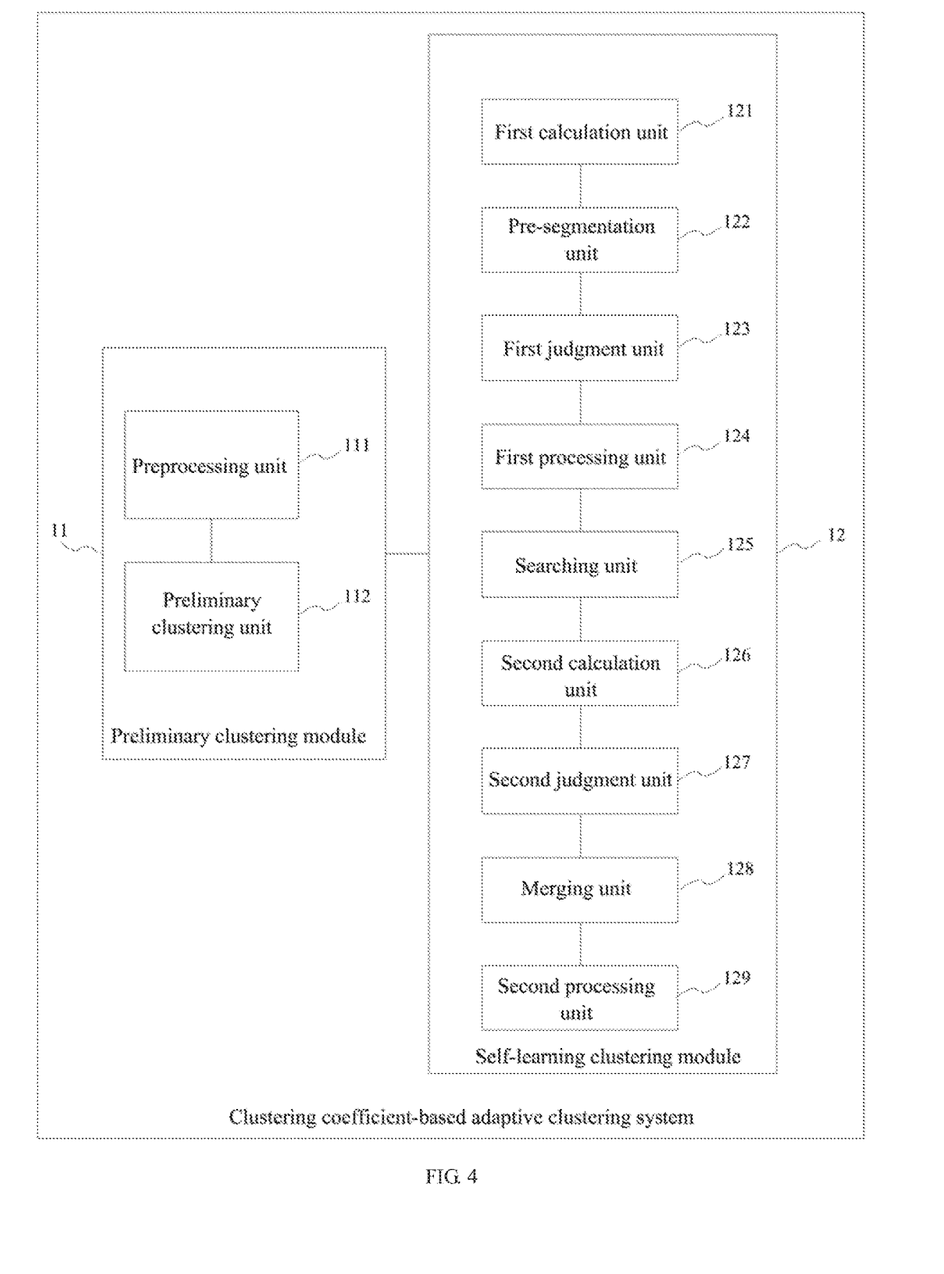
FIG. 4 illustrates a structural schematic diagram of a clustering coefficient-based adaptive clustering system provided by the present invention.

Please refer to FIG. 4, which illustrates a structural schematic diagram of a clustering coefficient-based adaptive clustering system. The clustering coefficient-based adaptive clustering system comprises a preliminary clustering module 11 and a self-learning clustering module 12. It needs to be particularly stated that, in different application examples, the preliminary clustering module 11 and the self-learning clustering module 12 can be configured in a server of a computer network system and can also be configured in a client in the server of the computer network system or be respectively configured in the server and the client.

The preliminary clustering module 11 is used for completing preliminary clustering and the preliminary clustering module 11 comprises a preprocessing unit 111 and a preliminary clustering unit 112, wherein the preprocessing unit 111 is used for acquiring association relations between the data points in the plurality of clustering object sets, acquiring the number of neighbor points in a nearest-neighbor algorithm applicable to searching of the number of the neighbor points, and acquiring a distribution curve convergence rate of the data points through a curve fitting technique. The preliminary clustering unit 112 is used for sequentially extracting data point pairs according to magnitude of association relations between the data points, determining to which categories the data points belong and the number of the categories according to categories of the extracted data point pairs and magnitude of association relations between the extracted data points, and establishing association relations between the data points and association relations between the categories till all data points are processed to acquire preliminary clustering results.

Functions of the preprocessing unit 111 and the preliminary clustering unit 112 will be specifically analyzed below.

The preprocessing unit 111 is used for acquiring association relations between data points in a plurality of clustering object sets, and ordering the association relations between the data points according to magnitude from high to low. For example, the association relations can be expressed by using association degree values, and from the angle of a graph, the association degree values are magnitude of weights of edges. At this point, the data points are vertexes in the graph, and the association relations between the data points are edges between the vertexes. The existence of an association relation indicates the existence of an edge, and the magnitude of the association relation is the magnitude of the weight of the edge (the greater the association value is, the shorter the length of the edge is, and intuitively the greater the association relation is, the shorter the distance between the vertexes is and the closer the vertexes are). Reciprocals of original association values can be expressed as side lengths between vertexes, i.e., association degree values called in an algorithm.

The preprocessing unit 111 is further used for performing statistics to distribution information of the association relations between the data points in the plurality of clustering object sets, and acquiring a curve convergence rate of the association relations between the data points in the plurality of clustering object sets by adopting a curve fitting technique according to statistical distribution information.

The preprocessing unit 111 is further used for performing statistics to distribution information of the number of neighbor points between the data points according to the nearest-neighbor algorithm for searching the number of the neighbor points, i.e., the k-nearest neighbor algorithm, k denoting the number of neighbor points, and acquiring a determined value of the number of the neighbor points.

The preprocessing unit 111 is further used for judging whether the number of the data points having the number of neighbor points greater than the determined value of the number of the neighbor points is greater than a predetermined number or not, if so, then continuously calling the preliminary clustering unit 112; if not, then terminating the process. The predetermined number is 90% of the data points in the clustering object sets.

The preliminary clustering unit 112 is used for sequentially extracting data point pairs according to the magnitude of the association relations between the data points, determining to which categories the data points belong and the number of the categories according to categories of the extracted data point pairs and magnitude of association relations between the extracted data points, establishing association relations between the data points and association relations between the categories till all data points are processed to acquire preliminary clustering results and continuous executing a self-learning clustering step.

The self-learning clustering module 12 is used for completing self-learning clustering and the self-learning clustering module 12 comprises a first calculation unit 121, a pre-segmentation unit 122, a first judgment unit 123, a first processing unit 124, a searching unit 125, a second calculation unit 126, a second judgment unit 127, a merging unit 128 and a second processing unit 129. Wherein, the first calculation unit 121 is used for calculating an intra-category similarity of each category, calculating a local clustering coefficient of data points in each category, comparing the intra-category similarity of each category with the local clustering coefficient of the data points in each category, and calling the pre-segmentation unit 122.

The pre-segmentation unit 122 is used for performing pre-segmentation according to a segmentation mode of segmentation each category into two sub-categories which respectively have a local clustering coefficient of data points greater than or equal to the intra-category similarity and a local clustering coefficient of data points smaller than the intra-category similarity, and calculating intra-category similarities of the two sub-categories and inter-category similarities of the two sub-categories, in this embodiment, the two sub-categories comprise a sub-category A and a sub-category B, formulas for calculating intra-category similarities of the two sub-categories A and B are respectively as follows:

$$clu(A) = \frac{\sum_{v_i \in V_A, e_{ij} \in E_A} C(i)}{|V_A|} \quad (1)$$

$$clu(B) = \frac{\sum_{v_i \in V_B, e_{ij} \in E_B} C(i)}{|V_B|} \quad (2)$$

wherein $V_i$ denotes data point i, $V_A$ denotes a set of data points in sub-category A, $V_B$ denotes a set of data points in sub-category B, $|V_A|$ denotes the number of data points in sub-category A, $|V_B|$ denotes the number of data points in sub-category B, $e_{ij}$ denotes the edge connecting data point i and data point j, $E_A$ denotes a set of edges in sub-category A, $E_B$ denotes a set of edges in sub-category B, and C(i) is a local clustering coefficient of data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}}. \quad (3)$$

wherein $V_j$, $V_k$ denote data points j, k, N(i) denotes a neighbor point set of data point $V_i$, E is a set of edges, k, denotes the number of N(i), and $e_{jk}$ denotes the edge connecting data point j and data point k; and formulas for calculating inter-category similarities of the two sub-categories A and B are respectively as follows:

$$assoc(A') = \frac{\sum_{v_i \in V_{A'}, e_{ij} \in U} C(i)}{|V_{A'}|} \quad (4)$$

-continued $$assoc(B') = \frac{\sum_{v_i \in V_{B'}, e_{ij} \in U} C(i)}{|V_{B'}|} \quad (5)$$

wherein $V_i$ denotes data point i, A' denotes sub-category A and category of data points which belong to category B and have association relations with sub-category A, B' denotes sub-category B and category of data points which belong to sub-category A and have association relations with sub-category B, $|V_{A'}|$ denotes the number of data points in category A', $|V_{B'}|$ denotes the number of data points in category B', $V_A$ denotes a set of data points in sub-category A, $V_B$ denotes a set of data points in sub-category B, $e_{ij}$ denotes the edge connecting data point i and data point j, and C(i) is a local clustering coefficient of data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}}.$$

The first judgment unit 123 is used for judging whether the two pre-segmented sub-categories satisfy a segmentation condition, wherein the segmentation condition is that the intra-category similarities of the two sub-categories are respectively greater than the inter-category similarities of the two sub-categories, i.e., clu(A)>assoc(A') and clu(B)>assoc(B'); if so, then accepting the pre-segmentation and generating a category set consisting of a plurality of categories, wherein in this embodiment, the two pre-segmented sub-category A and sub-category B, i.e., new generated categories also belong to the category set; if not, then canceling the pre-segmentation.

The first processing unit 124 is used for updating inter-category association relations between the two new generated categories and other categories, and deleting inter-category association relations between an original category of the two new categories and other categories.

The searching unit 125 is used for searching two categories with an association relation in the category set, wherein since each category therein comprises data points, the two categories having the association relation refer to that the two categories have an intersection therebetween;

The second calculation unit 126 is used for calculating intra-category similarities of the two categories having the association relation and inter-category similarities of the two categories, wherein in this embodiment, the two categories comprise a category A1 and a category A2, and specific calculation processes are as follows:

formulas for calculating intra-category similarities of the two categories A1 and A2 are respectively as follows:

$$clu(A1) = \frac{\sum_{v_i \in V_{A1}, e_{ij} \in E_{A1}} C(i)}{|V_{A1}|} \quad (6)$$

$$clu(A2) = \frac{\sum_{v_i \in V_{A2}, e_{ij} \in E_{A1}} C(i)}{|V_{A2}|} \quad (7)$$

wherein $V_i$ denotes data point i, $V_{A1}$ denotes a set of data points in category A1, $V_{A2}$ denotes a set of data points in category A2, $|V_{A1}|$ denotes the number of data points in category A1, $|V_{A2}|$ denotes the number of data points in category A2, $e_{ij}$ denotes the edge connecting data point i and data point j, $E_{A1}$ denotes a set of edges in category A1, $E_{A2}$ denotes a set of edges in category A2, and C(i) is a local clustering coefficient of data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}},$$

wherein $V_j$, $V_k$ denote data points j, k, N(i) denotes neighbor point set of data point $V_i$, E is a set of edges, $k_i$ denotes the number of N(i), and $e_{jk}$ denotes the edge connecting data point j and data point k; and formulas for calculating inter-category similarities of the two categories A1 and A2 are respectively as follows:

$$assoc(A1') = \frac{\sum_{v_i \in V_{A1'}, e_{ij} \in U} C(i)}{|V_{A1'}|} \quad (8)$$

$$assoc(A2') = \frac{\sum_{v_i \in V_{A2'}, e_{ij} \in U} C(i)}{|V_{A2'}|} \quad (9)$$

wherein $V_i$ denotes data point i, A1' denotes category A1 and category of data points which belong to category A2 and have association relations with category A1, A2' denotes category A2 and category of data points which belong to category A1 and have association relations with category A2, $|V_{A1'}|$ denotes the number of data points in category A1', $|V_{A2'}|$ denotes the number of data points in category A2', $V_{A1}$ denotes a set of data points in category A1, $V_{A2}$ denotes a set of data points in category A2, $e_{ij}$ denotes the edge connecting data point i and data point j, and C(i) is a local clustering coefficient of data point $V_i$, $$C(i) = \frac{|\{e_{jk}: V_j, V_k \in N(i), e_{jk} \in E\}|}{\frac{k_i(k_i-1)}{2} \frac{\sum_{e_{jk} \in N(i)} e_{jk}}{k_i}}.$$

The second judgment unit 127 is used for judging whether the two categories having the association relation satisfy a merging condition, wherein the merging condition is that the inter-category similarities of the two categories are respectively greater than the intra-category similarities of the two categories, i.e., clu(A)≤assoc(A') and clu(B)≤assoc(B'); if so, indicating the relation between the two categories is close and then calling the merging unit 128 to perform merging to the two categories to generate a new category; if not, indicating the relation between the two categories is distant, and then abandoning the merging.

The second processing unit 129 is used for updating inter-category association relations between a new generated category and other categories, and deleting inter-category association relations between the two categories and other categories. When the merging step is executed in this embodiment, all categories need to be traversed.

In this embodiment, the self-learning clustering module 12 is further used for cyclically performing segmentation and merging, the segmentation and merging steps comprising the steps of performing pre-segmentation again to all categories generated after segmentation and merge at the previous time, judging whether the pre-segmented categories satisfy the segmentation condition, if so, then accepting the pre-segmentation, judging whether every two categories in the new category set after segmentation satisfy the merging condition, if so, then merging the two categories which satisfy the merging condition, if not, then abandoning the merging; and abandoning the pre-segmentation if the pre-segmented categories do not satisfy the segmentation condition.

The clustering coefficient-based adaptive clustering system provided by this embodiment can be applied to a central processing unit of a server, and functions of the clustering coefficient-based adaptive clustering system are executed through the central processing unit.

When the clustering coefficient-based adaptive clustering method and system provided by the present invention are compared with the prior art, since the method introduces relations between data points into a clustering algorithm for the first time, data can be more accurately clustered.

Therefore, the present invention overcomes various disadvantages in the prior art and thus has a great industrial application value.

The above-mentioned embodiments are just used for exemplarily describing the principles and effects of the present invention instead of limiting the present invention. One skilled in the art can made modifications or variations to the above-mentioned embodiments without departing from the spirit and range of the present invention. Therefore, all equivalent modifications or variations made by those who have common knowledge in the art without departing from the spirit and technical concept disclosed by the present invention shall be still covered by the claims of the present invention.

What is claimed is:

1. A clustering coefficient-based adaptive clustering system, comprising:
   a plurality of servers;
   an application for clustering a set of elements required in a network by a method of coefficient-based adaptive clustering;
   the plurality of servers and a plurality of clients are constructed to form the network, the set of elements comprises data points in a plurality of clustering object sets;
   the application comprises:
      a preliminary clustering module used for completing a preliminary clustering step comprising:
         a preprocessing unit used for acquiring association relations between the data points in the plurality of clustering object sets, a preliminary clustering step including acquiring association relations between the data points in the plurality of clustering object sets, acquiring the number of neighbor points in a nearest-neighbor algorithm applicable for searching of the number of the neighbor points, and acquiring a distribution curve convergence rate of the data points through a curve fitting technique; sequentially extracting data point pairs according to a magnitude of the association relations between the data points, determining to which category the data points belongs and the number of the categories according to the category of the extracted data point pairs and the magnitude of the association relation between the data points extracted each time, and establishing a association relation between the data points and a association relation between the categories till all data points are processed to acquire preliminary clustering results;
and
a self-learning clustering module used for completing self-learning clustering comprising:
  a first calculation unit used for calculating an intra-category similarity of each category, calculating a local clustering coefficient of data points in each category, comparing the intra-category similarity of each category with the local clustering coefficient of the data points in each category, and calling a pre-segmentation unit;
  the pre-segmentation unit used for performing pre-segmentation according to a segmentation mode of segmenting each category into two sub-categories which respectively have a local clustering coefficient of data points greater than or equal to the intra-category similarity and a local clustering coefficient of data points smaller than the intra-category similarity, and calculating intra-category similarities of the two sub-categories and inter-category similarities of the two sub-categories;
  a first judgment unit used for judging whether the two pre-segmented sub-categories satisfy the segmentation condition, if so, then accepting the pre-segmentation and generating a category set consisting of a plurality of categories; if not, then canceling the pre-segmentation;
  a searching unit used for searching two categories having an association relation in the category set;
  a second calculation unit used for calculating intra-category similarities of the two categories having the association relation and inter-category similarities of the two categories; and
  a second judgment unit used for judging whether the two categories having the association relation satisfy a merging condition, if yes, indicating the relation between the two categories is close, and then calling a merge unit to merge the two categories to generate a new category; if not, indicating the relation between the two categories is distant, and then abandoning the merging.

2. The clustering coefficient-based adaptive clustering system according to claim 1, characterized in that the preliminary clustering module further comprises the steps of:
performing statistics to distribution information of the association relations between the data points in the plurality of clustering object sets, and acquiring a curve convergence rate of the association relations between the data points in the plurality of clustering object sets by adopting the curve fitting technique according to the statistical distribution information; and
performing statistics to the distribution information of the number of neighbor points between the data points according to the nearest-neighbor algorithm for searching the number of the neighbor points, acquiring a determined value of the number of the neighbor points, judging whether the number of the data points having the number of neighbor points greater than the determined value of the number of the neighbor points is greater than a predetermined number, if so, then sequentially extracting the data point pairs according to the magnitude of the association relation between the data points; if not, terminating the process.

3. The clustering coefficient-based adaptive clustering system according to claim 1, characterized in that:
the pre-segmentation unit updating the inter-category association relations between the two sub-categories and other categories, and deleting the inter-category association relations between the category to which the two sub-categories originally belongs and other categories; the merging unite updating the inter-category association relations between a new generated category and other categories, and deleting the inter-category association relations between the two categories and other categories.

4. The clustering coefficient-based adaptive clustering system according to claim 1, characterized in that the two sub-categories in the segmentation unit comprise a sub-category A and a sub-category B,
formulas for calculating the intra-category similarities of the two sub-categories A and B are respectively as follows:

$$clu(A) = \frac{\sum_{v_i \in V_A, e_{ij} \in E_A} C(i)}{|V_{A1}|};$$

$$clu(B) = \frac{\sum_{v_i \in V_B, e_{ij} \in E_B} C(i)}{|V_B|};$$

wherein $V_i$ denotes data point i, $V_A$ denotes a set of data points in the sub-category A, $V_B$ denotes a set of data points in the sub-category B, $|V_A|$ denotes the number of data points in the sub-category A, $|V_B|$ denotes the number of data points in the sub-category B, $e_{ij}$ denotes the edge connecting the data point i and the data point j, $E_A$ denotes a set of edges in the sub-category A, $E_B$ denotes a set of edges in the sub-category B, and C(i) is a local clustering coefficient of the data point $V_i$, $$C(i) = \frac{[\{e_{jk}: V_j, V_k \in N(i), e_{jk} \in E\}]}{\frac{k_i(k_i-1)}{2} \frac{\sum_{e_{jk} \in N(i)} e_{jk}}{k_i}},$$

wherein $V_j$, $V_k$ denote data points j, k, N(i) denotes a neighbor point set of the data point $V_i$, E is a set of edges, $k_i$ denotes the number of N(i), and $e_{jk}$ denotes the edge connecting data point j and data point k; and
formulas for calculating the inter-category similarities of the two sub-categories A and B are respectively as follows:

$$assoc(A') = \frac{\sum_{v_i \in V_{A'}, e_{ij} \in U} C(i)}{|V_{A'}|};$$

$$assoc(B') = \frac{\sum_{v_i \in V_{B'}, e_{ij} \in U} C(i)}{|V_{B'}|};$$

wherein $V_i$ denotes the data point i, A' denotes the sub-category A and the category of data points which belongs to the category B and has association relations with the sub-category A, B' denotes the sub-category B and the category of data points which belongs to the sub-category A and has association relations with the sub-category B, $|V_{A'}|$ denotes the number of data points in category A', $|V_{B'}|$ denotes the number of data points in category B', $V_A$ denotes a set of data points in the sub-category A, $V_B$ denotes a set of data points in the sub-category B, $e_{ij}$ denotes the edge connecting the data point i and the data point j, and C(i) is a local clustering coefficient of the data point Vi, $$C(i) = \frac{[\{e_{jk}: V_j, V_k \in N(i), e_{jk} \in E\}]}{\frac{k_i(k_i-1)}{2} \frac{\sum_{e_{jk} \in N(i)} e_{jk}}{k_i}}.$$

5. The clustering coefficient-based adaptive clustering system according to claim 4, characterized in that the segmentation condition is that the intra-category similarities of the two sub-categories are respectively greater than the inter-category similarities of the two sub-categories, clu(A)>assoc(A') and clu(B)>assoc(B').

6. The clustering coefficient-based adaptive clustering system according to claim 1, characterized in that, in the merging unit, the two categories comprise a category A1 and a category A2, formulas for calculating the intra-category similarities of the two categories A1 and A2 are respectively as follows:

$$clu(A1) = \frac{\sum_{v_i \in V_{A1}, e_{ij} \in E_{A1}} C(i)}{|V_{A1}|};$$

$$clu(A2) = \frac{\sum_{v_i \in V_{A2}, e_{ij} \in E_{A1}} C(i)}{|V_{A2}|};$$

wherein $V_i$ denotes a data point i, $V_{A1}$ denotes a set of data points in the category A1, $V_{A2}$ denotes a set of data points in the category A2, $|V_{A1}|$ denotes the number of the data points in the category A1, $|V_{A2}|$ denotes the number of the data points in the category A2, $e_{ij}$ denotes the edge connecting the data point i and the data point j, $E_{A1}$ denotes a set of edges in the category A1, $E_{A2}$ denotes a set of edges in the category A2, and C(i) is a local clustering coefficient of the data point $V_i$, $$C(i) = \frac{[\{e_{jk}: V_j, V_k \in N(i), e_{jk} \in E\}]}{\frac{k_i(k_i-1)}{2} \frac{\sum_{e_{jk} \in N(i)} e_{jk}}{k_i}}.$$

wherein $V_j$ $V_k$ denote the data points j, k, N(i) denotes a set of of neighbor points of the data point $V_i$, E is a set of edges, $k_i$ denotes the number of N(i), and $e_{jk}$ denotes the edge connecting the data point j and the data point k; and formulas for calculating the inter-category similarities of the two categories A1 and A2 are respectively as follows:

$$assoc(A1') = \frac{\sum_{v_i \in V_{A1'}, e_{ij} \in U} C(i)}{|V_{A1'}|};$$

$$assoc(A2') = \frac{\sum_{v_i \in V_{A2'}, e_{ij} \in U} C(i)}{|V_{A2'}|};$$

wherein Vi denotes the data point i, A1' denotes the category A1 and the category of data points which belong to category A2 and have association relations with the category A1, A2' denotes the category A2 and the category of data points which belong to category A1 and have association relations with category A2, $|V_{A1'}|$ denotes the number of data points in the category A1', $|V_{A2'}|$ denotes the number of data points in the category A2', $V_{A1}$ denotes a set of data points in the category A1, $V_{A2}$ denotes a set of data points in the category A2, $e_{ij}$ denotes the edge connecting the data point i and the data point j, and C(i) is a local clustering coefficient of the data point Vi, $$C(i) = \frac{[\{e_{jk}: V_j, V_k \in N(i), e_{jk} \in E\}]}{\frac{k_i(k_i-1)}{2} \frac{\sum_{e_{jk} \in N(i)} e_{jk}}{k_i}},$$

7. The clustering coefficient-based adaptive clustering system according to claim 6, characterized in that the merging conditions are that the inter-category similarities of the two categories are respectively greater than the intra-category similarities of the two categories, clu(A1)≤assoc(A1') and clu(A2)≤assoc(A2').

8. The clustering coefficient-based adaptive clustering system according to claim 1, characterized in that sequentially extracting the data point pairs according to the magnitude of the association relations between the data points further comprises detecting whether the extracted data point pairs satisfy features of one category according to a detection principle.

9. The clustering coefficient-based adaptive clustering system according to claim 8, characterized in that the detection principle is as follows: supposing that the number of data points in the one category is $n_1$, an intra-category average relation weight is $avg(n_1)$, a relation weight between the extracted data points and intra-category data points in the one category is $w_1$ and an average relation weight convergence rate of the one category is $y'_{n_1}$, if a formula $(1+y'_{n_1})* avg(n_1) > w_1$ is satisfied, the extracted data points can be added into the one category; or else, the extracted data points cannot be added into the one category.

* * * * *